US008671410B2

(12) United States Patent
Sinha

(10) Patent No.: US 8,671,410 B2
(45) Date of Patent: Mar. 11, 2014

(54) SYSTEM AND METHOD FOR ALLOCATION OF THREADS TO USER OBJECTS IN A COMPUTER SYSTEM

(75) Inventor: Anand Sinha, Hamilton (CA)

(73) Assignee: BlackBerry Limited, Waterloo (CA)

( * ) Notice: Subject to any disclaimer, the term of this patent is extended or adjusted under 35 U.S.C. 154(b) by 1870 days.

(21) Appl. No.: 11/240,204

(22) Filed: Sep. 30, 2005

(65) Prior Publication Data

US 2006/0075405 A1 Apr. 6, 2006

Related U.S. Application Data

(60) Provisional application No. 60/615,972, filed on Oct. 4, 2004.

(51) Int. Cl.
*G06F 9/46* (2006.01)
(52) U.S. Cl.
USPC .......................................... 718/104; 718/105
(58) Field of Classification Search
USPC ........................................................ 718/105
See application file for complete search history.

(56) References Cited

U.S. PATENT DOCUMENTS

| | | | |
|---|---|---|---|
| 5,857,191 A | | 1/1999 | Blackwell, Jr. et al. |
| 5,924,097 A | * | 7/1999 | Hill et al. ...................... 707/703 |
| 5,991,792 A | | 11/1999 | Nageswaran |
| 6,105,067 A | * | 8/2000 | Batra ............................ 709/227 |
| 6,112,196 A | * | 8/2000 | Zimowski et al. .................... 1/1 |
| 6,125,382 A | | 9/2000 | Brobst et al. |
| 6,219,694 B1 | | 4/2001 | Lazaridis et al. |
| 6,237,024 B1 | | 5/2001 | Wollrath et al. |
| 6,324,492 B1 | * | 11/2001 | Rowe .............................. 703/13 |
| 6,477,561 B1 | | 11/2002 | Robsman |
| 6,542,920 B1 | * | 4/2003 | Belkin et al. .................. 718/104 |
| 6,594,774 B1 | * | 7/2003 | Chapman et al. ................. 714/2 |
| 6,609,159 B1 | | 8/2003 | Dukach et al. |
| 6,704,737 B1 | | 3/2004 | Nixon et al. |
| 6,766,349 B1 | * | 7/2004 | Belkin .......................... 718/104 |
| 6,782,410 B1 | | 8/2004 | Bhagat et al. |
| 6,920,634 B1 | * | 7/2005 | Tudor ........................... 718/107 |

(Continued)

FOREIGN PATENT DOCUMENTS

| | | |
|---|---|---|
| WO | WO 91/20033 | 12/1991 |
| WO | WO 00/45286 | 8/2000 |

(Continued)

OTHER PUBLICATIONS

R. D. van der Mei; W. K. Ehrlich; P. K. Reeser; J. P. Francisco; "A decision support system for tuning Web servers in distributed object oriented network architectures"; ACM SIGMETRICS Performance Evaluation Review; vol. 27 , Issue 4 (Mar. 2000); pp. 57-62; Year of Publication: 2000.*

(Continued)

*Primary Examiner* — Camquy Truong
(74) *Attorney, Agent, or Firm* — The Danamraj Law Group, P.C.

(57) ABSTRACT

A method for allocating threads to a user in a computer system is described. The method comprises queuing up work for a first user and permanently assigning a first thread to the first user, wherein the first thread performs the queued up work for the first user, and wherein each time work is subsequently queued up for the first user, the first thread performs the queued up work for the first user.

3 Claims, 8 Drawing Sheets

(56) References Cited

U.S. PATENT DOCUMENTS

| | | | |
|---|---|---|---|
| 6,968,557 B1* | 11/2005 | Zhang et al. | 719/319 |
| 7,352,731 B1* | 4/2008 | Leung | 370/338 |
| 7,406,692 B2* | 7/2008 | Halpern et al. | 718/105 |
| 2002/0087913 A1 | 7/2002 | Harper et al. | |
| 2002/0194377 A1 | 12/2002 | Doolittle | |
| 2003/0081621 A1 | 5/2003 | Godfrey et al. | |
| 2003/0126184 A1 | 7/2003 | Austin | |
| 2003/0217087 A1 | 11/2003 | Chase et al. | |
| 2004/0139434 A1 | 7/2004 | Blythe | |
| 2004/0167959 A1 | 8/2004 | Doyle et al. | |
| 2006/0075406 A1 | 4/2006 | Sinha | |
| 2006/0117318 A1 | 6/2006 | Rumelhart et al. | |

FOREIGN PATENT DOCUMENTS

| | | |
|---|---|---|
| WO | WO 01/22215 A1 | 3/2001 |
| WO | WO 01/76120 A2 | 12/2001 |
| WO | WO 03/003256 A2 | 1/2003 |
| WO | 2004077259 | 9/2004 |

OTHER PUBLICATIONS

R. Hadharan; W. K. Ehrlich; D. Cura; P. K. Reeser; "End to End Performance Modeling of Web Server Architectures"; ACM SIGMETRICS Performance Evaluation Review; vol. 28, Issue 2 (Sep. 2000); pp. 57-63; Year of Publication: 2000.*
European Search Report; European Patent Office; Jan. 15, 2008; 11 pages.
Box, Don; "Q&A House of COM"; Microsoft Systems Journal; Sep. 1998; pp. 1-8.
Lee, Chia-Chen et al.; "Using Threading and Factory Model to Improve the Performance of Distributed Object Computing System"; ChungHwa Telecommunication Co.; pp. 371 to 376.
Brown, Mark R.; "FastCGI—Understanding FastCGI Application Performance"; Open Market, Inc.; Jun. 10, 1996; pp. 1-5.
International Search Report; PCT Office; 6 pages.
EPO Examination Report in EP Application No. 05791277.6 European Patent Office; Feb. 20, 2009; 5 pages.
Canadian Office Action Application No. 2005/001503; Canadian Intellectual Property Office; Dec. 9, 2008; 3 pages.
Canadian Office Action; Application No. 2,577,221; Canadian Intellectual Property Office; Feb. 15, 2010, 3 pages.
CIPO, Office Action, Application No. 2,577,221, Oct. 26, 2011, 2 pgs.
CIPO, Office Action, Application No. 2,577,230, Apr. 18, 2012, 3 pgs.
CIPO, Office Action, Application No. 2,577,221, Jan. 17, 2013, 2 pgs.
EPO, Communication Pursuant to Article 94(3) EPC, Application No. 05791277, Feb. 27, 2013, 8 pgs.
CA Office Action, Application No. 2,577,221, Canadian IPO, Dec. 20, 2010, 3 pgs.
CA Office Action, Application No. 2,577,230, Canadian IPO, Jan. 26, 2011, 3 pgs.
EP Communication Examination Report, Application No. 05791277.6, European Patent Office, Apr. 28, 2008, 1 pg.
EP Communication Examination Report, Application No. 05791409.5, European Patent Office, Apr. 2, 2008, 1 pg.
EP Communication Examination Report, Application No. 05791409.5, European Patent Office, Sep. 15, 2009, 5 pgs.
EP Search Report, Application No. 05791277.6, European Patent Office, Jan. 11, 2008, 9 pgs.
PCT International Preliminary Report and Written Opinion, Application No. PCT/CA2005/001503, European Patent Office, Apr. 19, 2007, 14 pgs.
PCT Search Report, Application No. PCT/CA2005/001502, European Patent Office, Jan. 10, 2006, 8 pgs.
Reilly, G., "The Art and Science of Web Server Tuning with Internet Information Services 5.0," Microsoft White Papers, Mar. 2001, 39 pgs.
Moore, "Tuning Internet Information Server Performance," Microsoft TechNet, Dec. 16, 1997, 2 pgs.
Xu, et al, "Performance Study and Dynamic Optimization Design for Thread Pool Systems," Iowa State University, Aug. 14, 2004, 6 pgs.
US Office Action, U.S. Appl. No. 11/240,205, USPTO, Mar. 20, 2009, 23 pgs.
US Office Action, U.S. Appl. No. 11/240,205, USPTO, Oct. 16, 2009, 26 pgs.
US Office Action, U.S. Appl. No. 11/240,205, USPTO, Apr. 15, 2010, 25 pgs.
US Office Action, U.S. Appl. No. 11/240,205, USPTO, Sep. 2, 2010, 29 pgs.
US Office Action, U.S. Appl. No. 11/240,205, USPTO, Mar. 3, 2011, 32 pgs.
CIPO, Office Action, Application No. 2,577,230, Aug. 7, 2013, 2 pgs.

* cited by examiner

SYSTEM AND METHOD FOR ALLOCATION OF THREADS TO USER OBJECTS IN A COMPUTER SYSTEM

PRIORITY UNDER 35 U.S.C. §119(e) & 37 C.F.R. §1.78

This nonprovisional application claims priority based upon the following prior U.S. provisional patent application entitled: "THREAD AFFINITY," Application No.: 60/615,972, filed Oct. 4, 2004, in the name(s) of Anand Sinha, which is hereby incorporated by reference.

CROSS-REFERENCE TO RELATED APPLICATION(S)

This application is related to U.S. patent application Ser. No.: 11/240,205, filed Sep. 30, 2005 entitled "SYSTEM AND METHOD FOR ADAPTIVE ALLOCATION OF THREADS TO USER OBJECTS IN A COMPUTER SYSTEM", now issued as U.S. Pat. No. 8,127,010 which is hereby incorporated by reference in its entirety.

TECHNICAL FIELD

The present disclosure relates, in general, to computer systems and, in particular, to a system and method for associating threads with user objects in such computer systems.

BACKGROUND

Threads are instances of software processes operating on a computer system. In operation, when a first user object has a task that needs to be performed, a master thread associates an available worker thread with the user object. Once the task has been completed, the first user object is placed in a wait state until it has another task to be performed and the worker thread is returned to a thread pool to be associated with another user having a task to be performed. When the first user object has another task to be performed, it is likely that a different thread will be assigned thereto to perform that task. Currently, each time a thread is assigned to a user object to perform a task, it must open all of the system resources necessary to perform the task. Similarly, each time a thread is finished performing the task and is returned to the thread pool, it must close all of the resources that have been opened before placing the user object in a wait state. This opening and closing of resources results in a tremendous increase in system resource overhead.

The extra overhead when multiple threads service a user object may include any of the following. First, one database may be held open by multiple threads, causing extra unnecessary network traffic. To alleviate this problem, each thread has to close and open the database, thus replacing the overhead caused by this problem with that caused by the additional opening/closing of the database. If a database fail over occurs, when a user object attempts to open the primary database, underlying technology will redirect the open call to the backup database. For the duration of that operation (i.e., until the database is closed), all requests will go to the backup database. The next time the database is opened, the process will be repeated, with the request first trying to open the primary database until the underlying technology determines that the backup database needs to be attempted. This process often takes a lot of time, resulting in users experiencing latency in operations such as E-mail delivery, over-the-air calendar synchronization, et cetera.

A related problem exists in that a thread can get "hung" or "hung up". This can occur for many reasons. One reason is that there is contention for system resources such as memory resources, processor resources, and network resources. For example, assuming a first thread locks a resource, when a second thread needs to use the same resource, the second thread will wait for the first thread to release, or unlock, the resource. If the first thread crashes or is for some other reason unable to unlock the resource, the second thread will get hung.

Additionally, a thread could get hung due to an error in a communications subsystem, such as a mail application programming interface ("API"). When a thread makes a call to the subsystem, the thread is locked in and at the mercy of that subsystem. If there is a crash in the subsystem, the thread will be hung. The same scenario also applies on the case of operating systems. It is also possible that the subsystem could get hung itself, which would hang the calling thread.

Finally, a thread could get hung as a result of a network request taking an excessively long time to complete, due to poor network conditions or hardware issues (such as domain controllers being down, routers/repeaters being down), for example. In this scenario, the thread gets hung waiting for the network to return.

Hang up conditions waste valuable processing time and create undesirable overhead as a result of the need to track and monitor the threads that are hung. For the foregoing and other reasons, there exists a need to improve upon the utilization of computer system resources.

BRIEF DESCRIPTION OF THE PREFERRED EMBODIMENTS

For a more complete understanding of the features and advantages of the present method and mobile device, reference is now made to the detailed description along with the accompanying figures in which corresponding numerals in the different figures refer to corresponding parts and in which.

DETAILED DESCRIPTION OF THE DRAWINGS

Figure 1:
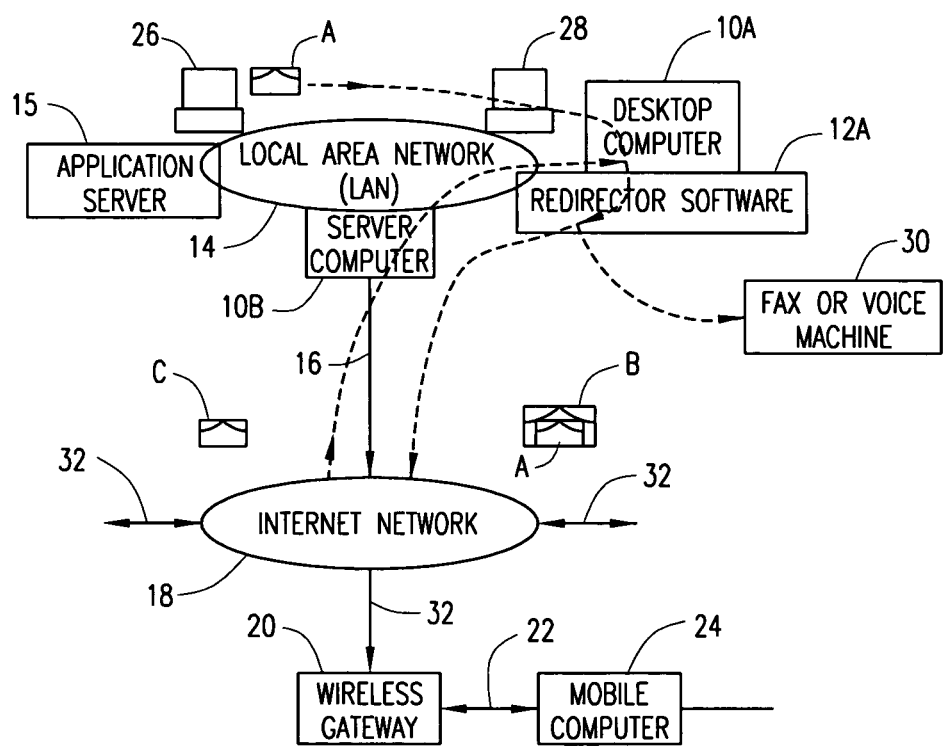
FIG. 1 is a system diagram depicting redirection of user data items from a host system comprising a user's PC to the user's mobile data communication device ("MDCD"), wherein redirector software is operating at the user's PC.

A method and system for providing effective thread processing in a business enterprise environment is provided. In one embodiment, threads are permanently assigned to and associated with a user object. This is concept is referred to herein as "thread affinity", which will be described below in an exemplary context of data item redirection as may be employed in a mobile communications environment.

As used in this application, the term "host system" refers to a computer system on which software for redirecting user data items to a user's MDCD ("redirector software") is operating. In one embodiment, the host system is a user's PC; in an alternative embodiment, the host system is a network server connected to a user's PC via a local area network ("LAN"). In yet another alternative embodiment, the host system could be any other system that is in communication with a user's PC.

Instead of warehousing (or storing) a user's data items at the host system and then "synchronizing" the user's MDCD to data items stored at the host system when the mobile device requests that such items of information be communicated to it, the exemplary application of the present disclosure employs a "push" paradigm that continuously packages and retransmits the user's data items to the MDCD in response to a triggering event detected at the host system. Wireless MDCDs, especially those that can return a confirmation signal to the host that the pushed data has been received, are especially well-suited for this type of push paradigm. Due to bandwidth limitations of wireless networks, redirection of only a portion of a data item may be desirable, with the user given the option of then retrieving the entire data item (or some other portion of the data item) from the host system.

An embodiment of a business enterprise server may include a redirection system or redirector software operating at the host system that enables the user to cause certain user-selected data items (or parts of data items) to be redirected or mirrored from the host system to the user's MDCD upon detecting that one or more user-defined triggering events have occurred. Also operating at the host system are various subsystems that may be configured to create triggering events, such as a screen saver subsystem or a keyboard subsystem, as well as subsystems for repackaging the user's data items for transparent delivery to the MDCD, such as a Transmission Control Protocol/Internet Protocol ("TCP/IP") subsystem or one or more E-Mail subsystems. Other subsystems for creating triggering events and repackaging the user's data items could also be present at the host system. The host system also includes a primary memory store where the user's data items are normally stored.

Using the redirector software of a business enterprise server, the user can select certain data items for redirection, such as E-mail messages, calendar events, meeting notifications, address entries, journal entries, personal reminders, and others. Having selected the data items to be redirected, the user can then configure one or more event triggers to be sensed by the redirector software to initiate redirection of the selected data items. These user-defined event triggers include external events, internal events, and networked events. Examples of external events include receiving a message from the user's MDCD to begin redirection, receiving a similar message from some external computer, sensing that the user is no longer in the vicinity of the host system, or any other event that is external to the host system. Internal events include a calendar alarm, screen saver activation, a keyboard timeout, timeout of a programmable timer, or any other event that is internal to the host system. Networked events are user-defined messages that are transmitted to the host system from another computer coupled to the host system via a network to initiate redirection. These are just some of the examples of the types of user-defined events that can trigger the redirector software to push data items from the host system to the MDCD.

Although in a particular embodiment it is anticipated that the configuration that specifies which data items will be redirected and in what form will be set or modified at the host system, it is within the scope of this disclosure that such configuration may be set or modified through data sent from the MDCD.

In addition to the functionality noted above, the redirector software may provide a set of possibly software-implemented control functions for determining the type of MDCD and its address, for programming a preferred list of message types that are to be redirected, and for determining whether the MDCD can receive and process certain types of message attachments, such as word processor or voice attachments. The determination of whether a particular MDCD can receive and process attachments is initially configured by the user of that MDCD at the host system. This configuration can be altered on a global or per-message basis by transmitting a command message from the MDCD to the host system. If the redirector software is configured so that the MDCD cannot receive and process word processor or voice attachments, then the redirector software will route such attachments to an external machine that is compatible with the particular attachment, such as an attached printer or networked fax machine or telephone.

Other types of attachments could be redirected to other types of external machines in a similar fashion, depending upon the capabilities of the MDCD. For example, if a user is traveling and receives a message with an attachment that the user's MDCD cannot process or display, the user may send a command message from the MDCD to the host system indicating that the attachment is to be sent to a fax machine at a hotel where the user will be spending the evening. This enables the user to receive important E-mail attachments as long as the host system is provided with sufficient information about the destination to which the attachment is to be forwarded.

Once an event has triggered redirection of one or more of a user's data items, the host system may then repackage these items in a manner that is transparent to the MDCD, so that information on the MDCD appears similar to information on the user's host system. One repackaging method includes wrapping the user data items in an E-mail envelope that corresponds to the address of the MDCD, although, alternatively, other repackaging methods could be used with the present disclosure, such as special-purpose TCP/IP wrapping techniques, or other methods of wrapping the data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages sent to the MDCD and messages sent from the MDCD to be encrypted and decrypted, as well as compressed and decompressed.

In an alternative system and method, the redirector software executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' MDCDs. In response to receiving one of these triggers, the server redirects the user's data items to the proper MDCD. The user data items and addressing information for a particular mobile device can be stored at the server or at the user's PC. Using this alternative configuration, one redirector software can serve a plurality of users. This alternative configuration could also include an internet- or intranet-based redirector software that could be accessible through a secure web page or other user interface. The redirector software could be located on an Internet Service Provider's system and accessible only through the Internet.

In another alternative configuration of the exemplary application of the present disclosure, a redirector software operates at both the host system and at the user's MDCD. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

Referring now to the drawings, FIG. 1 is an example system diagram showing the redirection of user data items (such as message A or C) from a user's office PC (host system) 10A to the user's MDCD 24, where the redirector software 12A is operating at the user's PC. Message A in FIG. 1 represents an internal message sent from desktop 26 to the user's host system 10A via enterprise network 14, such as a local area network ("LAN"). Message C in FIG. 1 represents an external message from a sender that is not directly connected to the enterprise network 14, such as the user's MDCD 24, some other user's mobile device (not shown), or any user connected to the Internet 18. Message C also represents a command message from the user's MDCD 24 to the host system 10A. The host system 10A preferably includes, along with the typical hardware and software associated with a workstation or desktop computer, the redirector software 12A, as well as a TCP/IP subsystem, a primary message store, an E-mail subsystem, a screen saver subsystem, and a keyboard subsystem, which elements are not explicitly shown in FIG. 1.

In FIG. 1, the host system 10A is the user's desktop system, typically located in the user's office. The host system 10A is connected to an enterprise network 14, which may be a packet-switched network and which can include one or more geographic sites and, in the illustrated embodiment, is organized as a local area network ("LAN"), for serving a plurality of corporate users. A number of application servers, represented in FIG. 1 by an application server 15, disposed as part of the enterprise network 14 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, collectively represented in FIG. 1 by desktop computers 26 and 28, may be operably networked to one or more of the application servers 15 with respect to the services supported in the enterprise network 14.

Additionally, a remote services server 10B may be interfaced with the enterprise network 14 for enabling a corporate user to access or effectuate any of the services from a remote location via the MDCD 24.

The enterprise network 14 is connected to a wide area network ("WAN") 18, preferably the Internet, which is defined by the use of TCP/IP to exchange information, but which, alternatively could be any other type of WAN. The connection of the enterprise network 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless MDCDs 24. Also shown in FIG. 1 is machine 30, which could be a FAX machine, a printer, a system for displaying images (such as video) or a machine capable of processing and playing audio files, such as a voice mail system. The present disclosure includes the ability to redirect certain message attachments to such an external machine 30 if the redirector software configuration data reflects that the MDCD 24 cannot receive and process the attachments, or if the user has specified that certain attachments are not to be forwarded to MDCD 24, even if such device can process those attachments. By way of example, consider an E-mail sent to a user that includes three attachments—a word processing document, a video clip and an audio clip. The redirector software could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the disclosure, but rather to illustrate the variety of possibilities embodied in the redirection concept.

The MDCD 24 may be a hand-held two-way wireless paging computer, a wirelessly enabled palm-top computer, a mobile telephone with data messaging capabilities, or a wirelessly enabled laptop computer, but could, alternatively be other types of MDCDs capable of sending and receiving messages via a network connection 22. Although the system may operate in a two-way communications mode, certain aspects of the disclosure could be beneficially used in a "one and one-half" or acknowledgment paging environment, or even with a one-way paging system. The MDCD 24 may be configured, for example via software program instructions, to work in conjunction with the redirector software 12A to enable the seamless, transparent redirection of user-selected data items.

In an alternative embodiment of the present disclosure, not explicitly shown in the drawings, the MDCD 24 also includes redirector software. In this embodiment, user selected data items can be replicated from the host to the mobile device and vice versa. The configuration and operation of the MDCD 24 having redirector software is similar to that described herein with respect to FIGS. 1-2.

A user of the present disclosure can configure the redirector software 12A to push certain user-selected data items to the user's MDCD 24 when the redirector 12A detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10A, or that the host system 10A acquires through the use of intelligent agents, such as data that is received after the host system 10A initiates a search of a database or a website or a bulletin board. In some instances, only a portion of the data item is transmitted to the MDCD 24 in order to minimize the amount of data transmitted via the wireless network 22. In these instances, the MDCD 24 can optionally send a command message to the host system to receive more or all of the data item if the user desires to receive it.

Among the user-defined event triggers that can be detected by the redirector software 12A are in the preferred embodiment external events, internal events and networked events. External events preferably include: (1) receiving a command message (such as message C) from the user's MDCD to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present disclosure to initiate replication of the user-selected data items from the host system 10 to the MDCD 24.

FIG. 1 shows an E-mail message A being communicated over enterprise network 14 from computer 26 to the user's desktop system 10A (also shown in FIG. 1 is an external message C, which could be an E-mail message from an Internet user, or could be a command message from the user's MDCD 24). Once the message A (or C) reaches the primary message store of the host system 10A, it can be detected and acted upon by the redirector software 12A. The redirector software 12A can use many methods of detecting new messages.

Assuming that the redirector software 12A is activated, and has been configured by the user (either through the sensing of an internal, network or external event) to replicate certain user data items (including messages of type A or C) to the MDCD 24, when the message A is received at the host system 10A, the redirector software 12A detects its presence and prepares the message for redirection to the MDCD 24. In preparing the message for redirection, the redirector software 12A could compress the original message A, could compress the message header, or could encrypt the entire message A to create a secure link to the MDCD 24.

Also programmed into the redirector software 12A is the address of the user's MDCD 24, the type of device, and whether the device 24 can accept certain types of attachments, such as word processing or voice attachments. If the user's type of mobile device cannot accept these types of attachments, then the redirector software 12A can be programmed to route the attachments to a fax or voice number where the user is located using an attached fax or voice machine 30.

The redirector software 12A may also be programmed with a preferred list mode that is configured by the user either at the host system 10A, or remotely from the user's MDCD by transmitting a command message C. The preferred list contains a list of senders (other users) whose messages are to be redirected or a list of message characteristics that determine whether a message is to be redirected. If activated, the preferred list mode causes the redirector software 12A to operate like a filter, only redirecting certain user data items based on whether the data item was sent from a sender on the preferred list or has certain message characteristics that if present will trigger or suppress redirection of the message. In the example of FIG. 1, if desktop computer 26 was operated by a user on the preferred list of host system 10A, and the preferred list option was activated, then message A would be redirected. If, however, desktop computer 26 was operated by a user not on the host system's preferred list, then message A would not be redirected, even if the user of the host system had configured the redirector to push messages of type A. The user of the host system 10A can configure the preferred list directly from the desktop system, or, alternatively, the user can then send a command message (such as C) from the MDCD 24 to the desktop system 10A to activate the preferred list mode, or to add or delete certain senders or message characteristics from the preferred list that was previously configured. It should be appreciated that a redirector program 12A could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector software 12A has determined that a particular message should be redirected, and it has prepared the message for redirection, the software 12A then sends the message A to a secondary memory store located in the MDCD 24, using whatever means are necessary. In the preferred embodiment this method is to send the message A back over the enterprise network 14, WAN 18, and through the wireless gateway 20 to the MDCD 24. In doing so, the redirector preferably repackages message A as an E-mail with an outer envelope B that contains the addressing information of the MDCD 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the MDCD 24, the outer envelope B is removed and the original message A is placed in the secondary memory store within the MDCD 24. By repackaging and removing the outer envelope in this manner, the present disclosure causes the MDCD 24 to appear to be at the same physical location as the host system 10A, thus creating a transparent system.

In the case where message C is representative of an external message from a computer on the Internet 18 to the host system 10A, and the host system 10A has been configured to redirect messages of type C, then in a similar manner to message A, message C would be repackaged with an outer envelope B and transmitted to the user's MDCD 24. In the case where message C is representative of a command message from the user's MDCD 24 to the host system 10A, the command message C is not redirected, but is acted upon by the host system 10A.

If the redirected user data item is an E-mail message, as described above, the user at the MDCD 24 sees the original subject, sender's address, destination address, carbon copy and blind carbon copy. When the user replies to this message, or when the user authors a new message, the software operating at the MDCD 24 adds a similar outer envelope to the reply message (or the new message) to cause the message to be routed first to the user's host system 10A, which then removes the outer envelope and redirects the message to the final destination, such as back to computer 26. In the preferred embodiment, this results in the outgoing redirected message from the user's host system 10A being sent using the E-mail address of the host mailbox, rather than the address of the mobile device, so that it appears to the recipient of the message that the message originated from the user's desktop system 10A rather than the MDCD 24. Any replies to the redirected message will then be sent to the desktop system 10A, which if it is still in redirector mode, will repackage the reply and resend it to the user's mobile data device, as described above.

Figure 2:
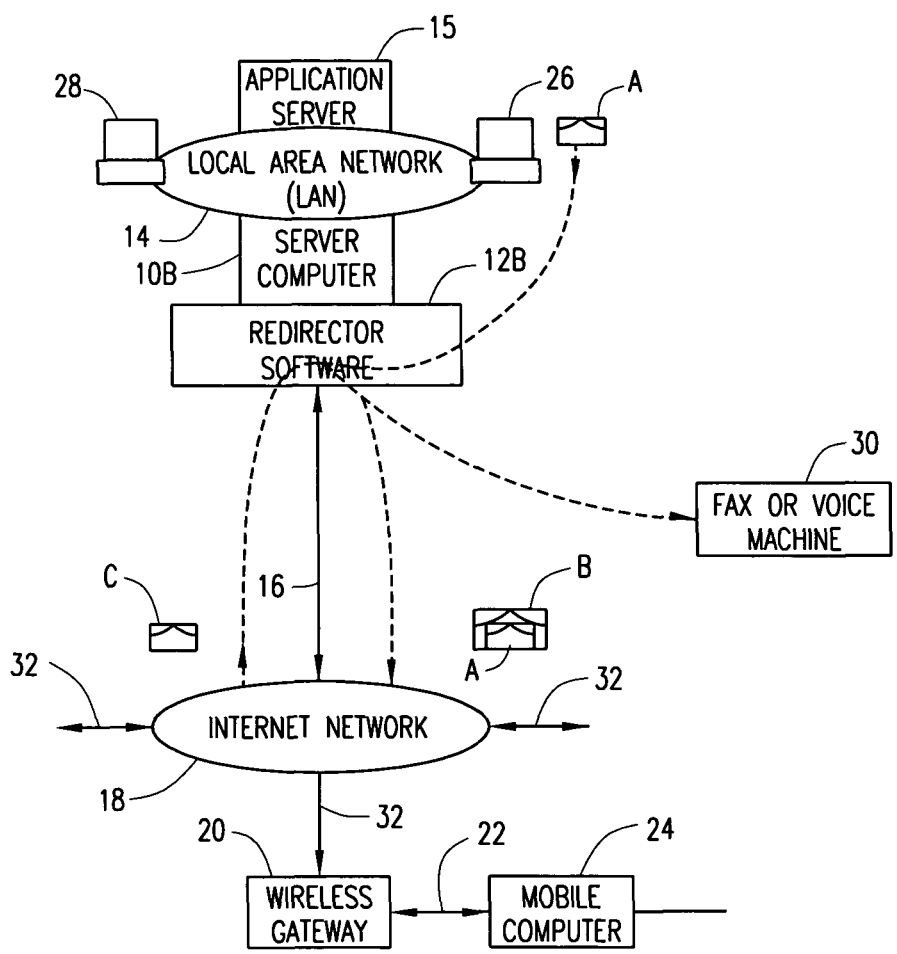
FIG. 2 is a system diagram depicting redirection of user data items from host system comprising a network server to a user's MDCD, wherein redirector software is operating at the server.

FIG. 2 is an alternative system diagram showing the redirection of user data items from the remote services server 10B to the user's MDCD 24, where the redirector software 12B is operating at the server 10B. This configuration is particularly advantageous for use with message servers, which are normally operated so that all user messages are stored in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 10B preferably maintains a user profile for each user's desktop system 26, 28, including information such as whether a particular user can have data items redirected, which types of message and information to redirect, what events will trigger redirection, the address of the users' MDCD 24, the type of mobile device, and the user's preferred list, if any. The event triggers are preferably detected at the user's desktop system 26, 28, and can be any of the external, internal or network events listed above. The desktop systems 26, 28, preferably detect these events and then transmit a message to the server computer 10B via enterprise network 14 to initiate redirection. Although the user data items are preferably stored at the server computer 10B in this embodiment, they could, also or alternatively, be stored at each user's desktop system 26, 28, which would then transmit them to the server computer 10B after an event has triggered redirection.

As shown in FIG. 2, desktop system 26 generates a message A that is transmitted to and stored at the host system 10B, which is the network server operating the redirector software 12B. The message A is for desktop system 28, but in this embodiment, user messages are stored at the network server 10B. When an event occurs at desktop system 28, an event trigger is generated and transmitted to the network server 10B, which then determines who the trigger is from, whether that desktop has redirection capabilities, and if so, the server (operating the redirector software) uses the stored configuration information to redirect message A to the mobile computer 24 associated with the user of desktop system 28.

Additional details regarding the exemplary redirection system may be found in U.S. Pat. No. 6,219,694 to Lazaridis et al., which is hereby incorporated by reference.

As previously noted, threads are instances of software processes, such as the redirector software 12A, 12B, that operate on a computer system. In particular, as used herein, the term "threads" refers to instances of software processes that operate on the business enterprise server.

Figure 3:
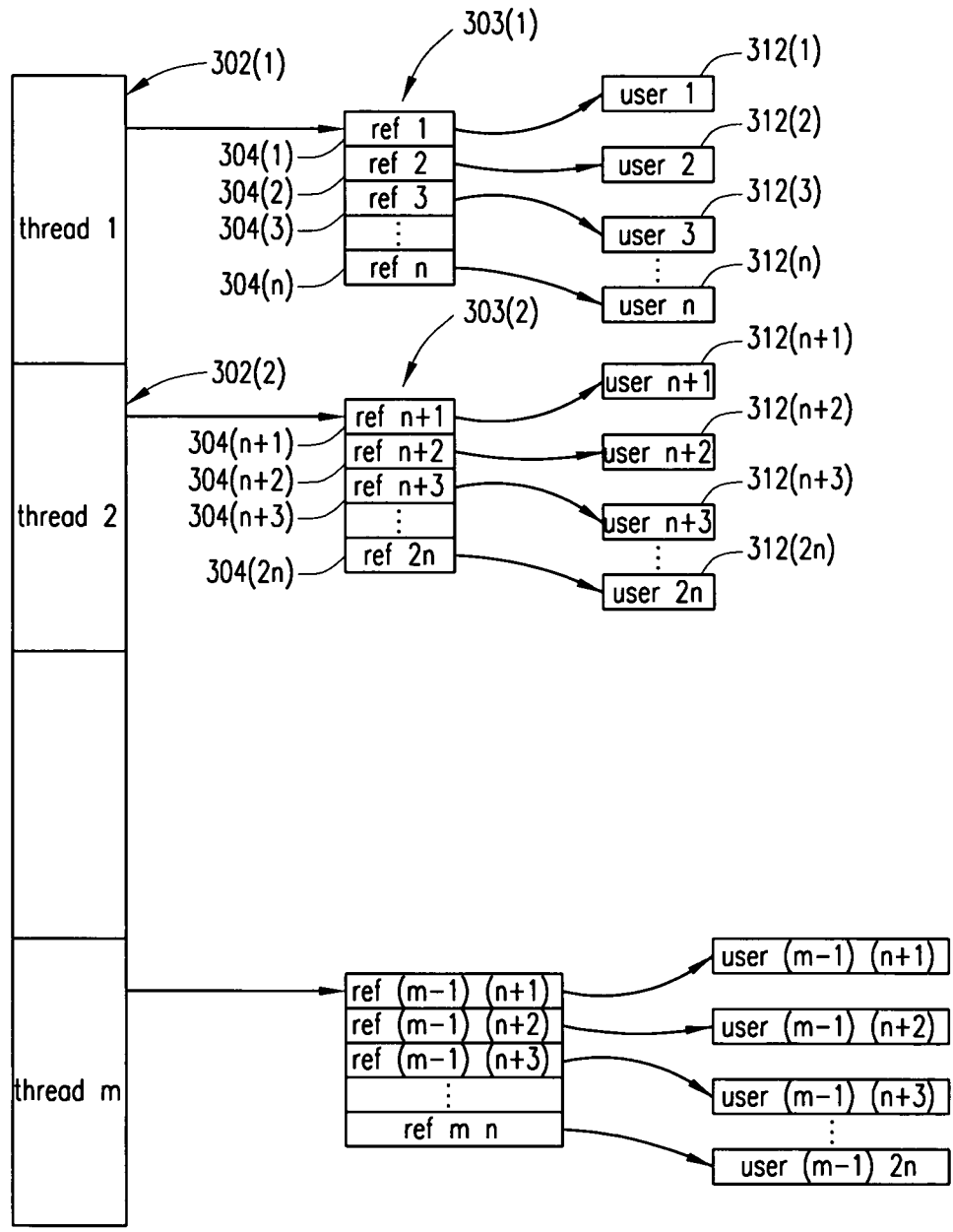
FIG. 3 is a diagram depicting a process of assignment of primary threads to user control objects in accordance with an embodiment.

FIG. 3 depicts an exemplary block diagram of the association of primary threads with user objects, or simply "users", in accordance with one embodiment. As illustrated in FIG. 3, a first thread 302(1) has associated therewith a list of references 303(1) comprising n references 304(1)-304(n) each corresponding to an instance of a software process. As illustrated in FIG. 3, the reference 304(1) of the first thread 302(1) is permanently associated with a first user 312(1). Similarly, references 304(2)-304(n) of the thread 302(1) are each permanently associated with a respective user 312(2)-312(n). It is possible that a particular thread, such as the thread 302(1), will be assigned to only one user.

A second thread 302(2) has associated therewith a list of references 303(2) comprising n references 304(n+1)-304(2n) each corresponding to an instance of a software process. Each reference of the second thread 302(2) is permanently associated with a user 312(n+1)-312(2n). For example, as illustrated in FIG. 3, the reference 304(n+1) is permanently associated with the user 312(n+1). Other threads may have similar references similarly assigned to various users.

Figure 4:
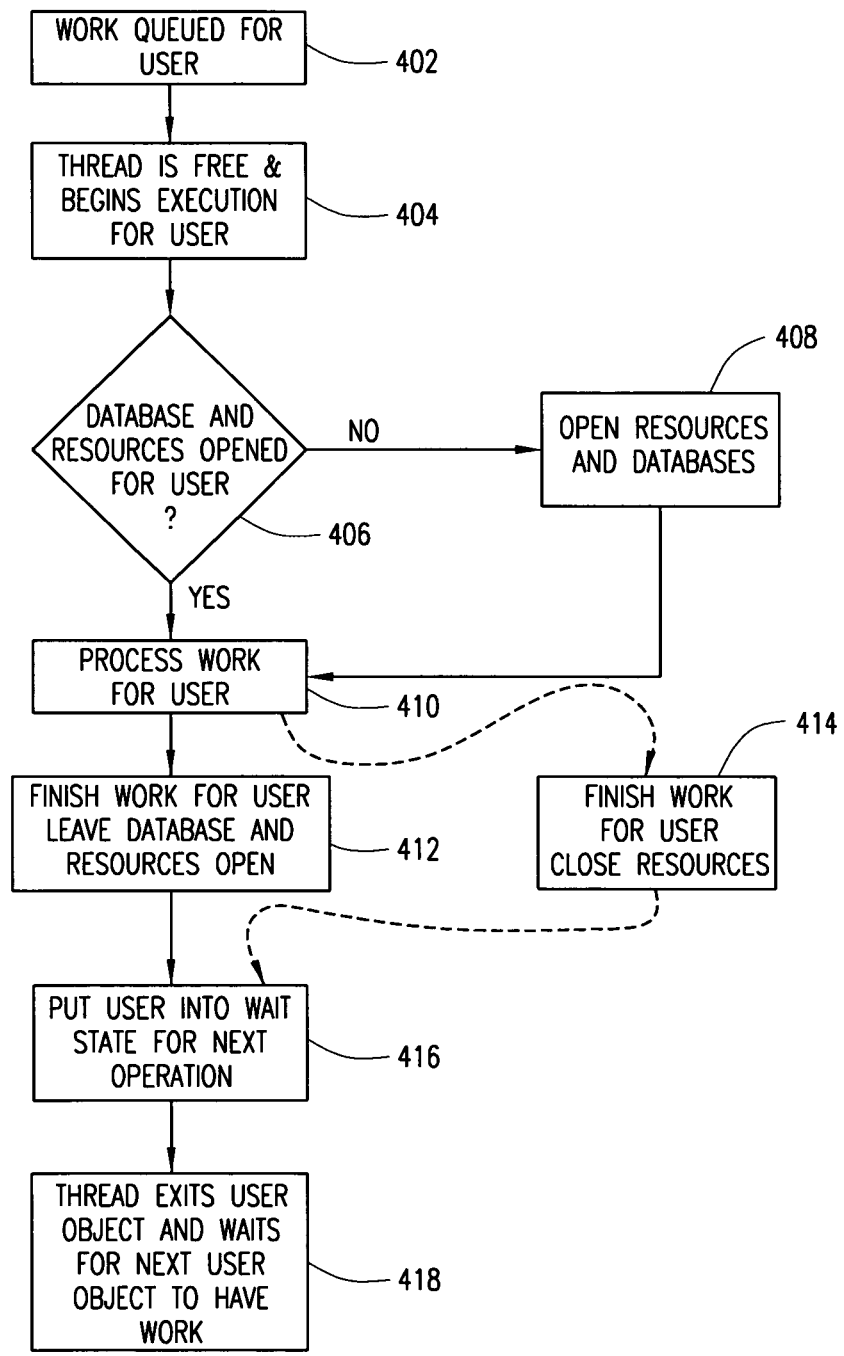
FIG. 4 is a flowchart depicting a method of a thread performing a task for an associated user object in accordance with an embodiment.

FIG. 4 depicts a flowchart of a method of a thread opening an associated user object, including opening databases and allocating resources for the user, in accordance with an embodiment. When a thread starts a user object, it opens the resources needed for that user. By opening on that thread, and using only that thread to access the necessary resources, such as databases, the resources can be left open, without incurring extra overhead incurred when multiple threads, as described above. In the method of FIG. 4, work is queued for a user (block 402). An instance of a thread that is free is assigned to that user (block 404).

Next, a determination is made whether the necessary databases and resources, such as network connections, have been opened for the user (block 406). If not, then those resources and databases are opened (block 408). After the resources and databases are opened (block 408) or if a determination is made that the necessary resources and databases have been opened, work is processed for the first user (block 410). In accordance with features of one embodiment, when work for the user is finished, the databases and resources remain open (block 412). Alternatively, in special cases (e.g., when the system is being shut down or when threads are being reallocated, as described in detail below with reference to FIGS. 7 and 8) when work for the user is finished, the databases and resources may be closed (block 414). User information is placed in a table or other record to indicate what thread was used, processing time, and other metrics and the user is placed in a wait state is entered (block 416). At this point, the thread exits the user object and waits for another user object associated therewith to have a task to be performed (block 418). In accordance with features of the embodiments described herein, because, as previously noted, a thread is permanently associated with a user, whenever work is subsequently queued for the user, the same thread will be used to process the work.

Figure 5:
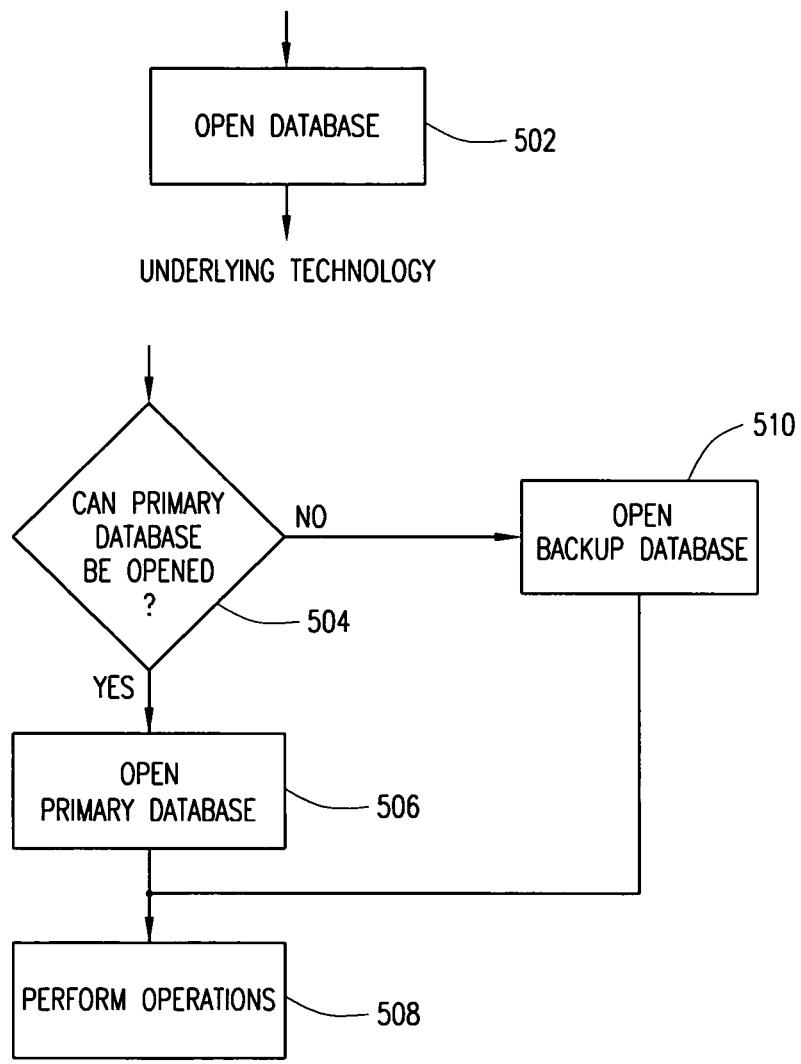
FIG. 5 is a flowchart depicting a method for switching between a primary database and a backup database in accordance with an embodiment.

FIG. 5 depicts a flowchart of a method for switching between a primary database and a backup database in accordance with one embodiment. Without thread affinity, as described herein, this switching operation is likely to be repeated for every task performed on behalf of the user. On the business enterprise server, the switching operation could happen at a periodicity as often as a few seconds when a new mail or calendar event is scanned. Since the decision whether to open the primary or backup database can take minutes, the business enterprise server may queue up multiple actions, causing the thread to be non-responsive. By having one thread open a database for a user (block 502) and keeping the database open, slowdowns due to fail-over from the primary database to the backup database will occur only once; that is, the first time the fail over is detected. Subsequently, underlying technology will recognize that the backup database is to be used.

In particular, responsive to an attempt to open a database, a determination is made as to whether the primary database can be opened (block 504). If so, the primary database is open (block 506); otherwise, an attempt is made to open the backup database (block 510). Once either the primary or backup database is open, the thread operations corresponding to the user are performed (block 508).

Figure 6:
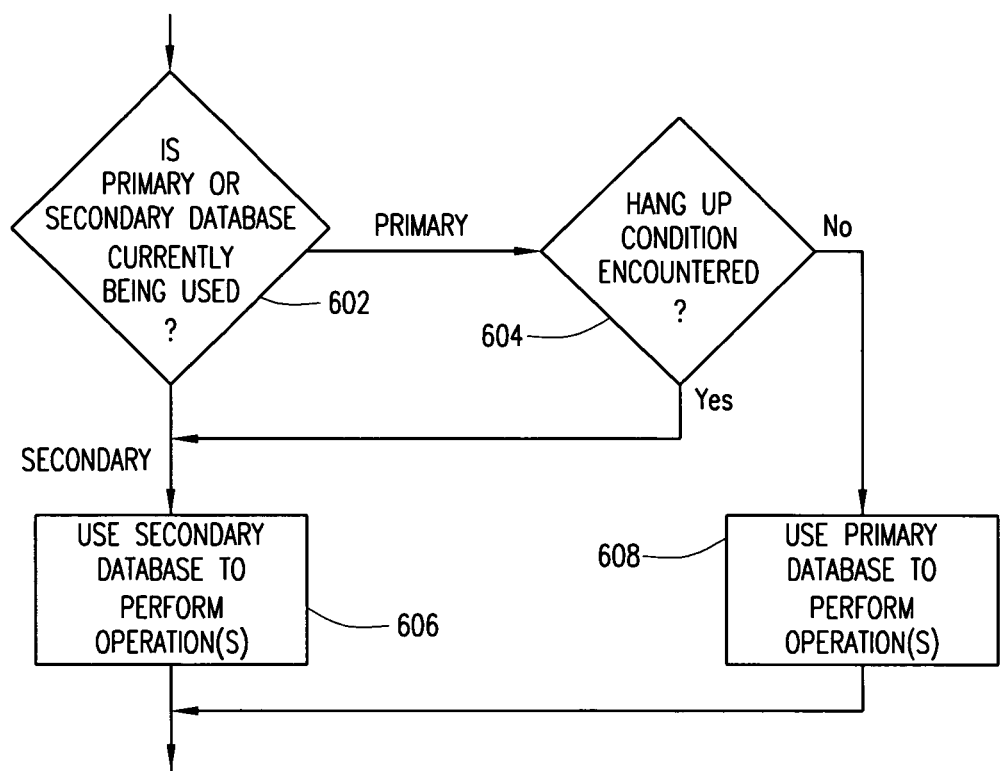
FIG. 6 is a flowchart depicting a method of responding to a hang up condition in accordance with an embodiment.

FIG. 6 is a flowchart depicting a method of responding to a hang up condition in accordance with an embodiment. In particular, measurements are taken to determine whether a thread is being processed as it should according to certain metrics. For example, a thread may be processing slower than a second standard deviation of a typical process indicates that it should. A determination is made as to whether the primary or a secondary database is currently being used (block 602).

In accordance with features of the embodiments described herein, if the primary database is being used, the database is already open, so an operation may be performed using that database (block 608), unless a hang up condition is encountered (block 604), as determined in the manner described above. The first time a hang up condition is detected, an attempt will be made to open a secondary database (block 606). Once this decision has been made, subsequent actions on this database do not require an attempt to open/access the primary database; rather, the operations will be performed using the secondary database.

Figure 7:
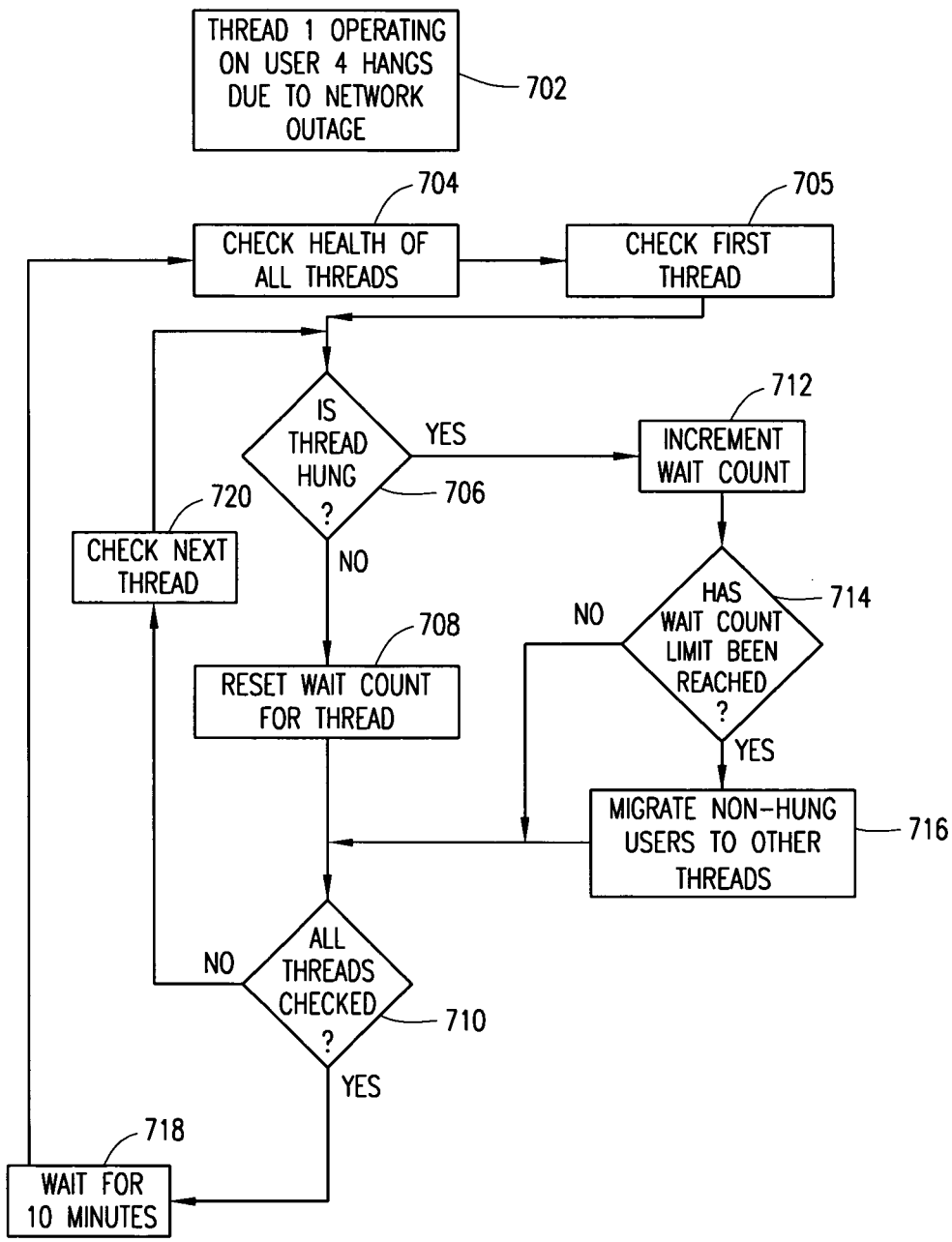
FIG. 7 is a flowchart depicting a method of processing due to unforeseen circumstances in accordance with an embodiment.

FIG. 7 is a flowchart depicting a method of processing due to unforeseen circumstances in accordance with an embodiment. Such unforeseen circumstances may include, for example, a situation in which a first thread ("thread 1") operating on a user object ("user 4") hangs due to a network outage (block 702). In order to respond to such a situation, periodically, the health of all threads is checked (block 704). First, a first thread is checked (block 705) and a determination is made whether the thread is hung up (block 706). If so, a wait count is incremented (block 712). Once a threshold of the wait count is reached (block 714), the remaining (i.e., non-hung) users associated with the hung thread are migrated to other threads (block 716). The migration process is accomplished by inactivating in the hung thread's list of references all of the references except for the reference to the user object for which the thread is currently working (in this case, user 4) and adding each of those inactivated references to the reference list of another thread. As reference lists are dynamic, they can grow and shrink seamlessly. If it is determined that the thread is not hung up (block 706), the wait count for the thread is reset (block 708).

Next, a determination is made as to whether all of the threads have been checked (block 710). If the all of threads have not been checked, the next thread is checked (block 720); otherwise, the health of all threads is checked after a predetermined period of time (e.g., ten minutes) (block 718).

Figure 8:
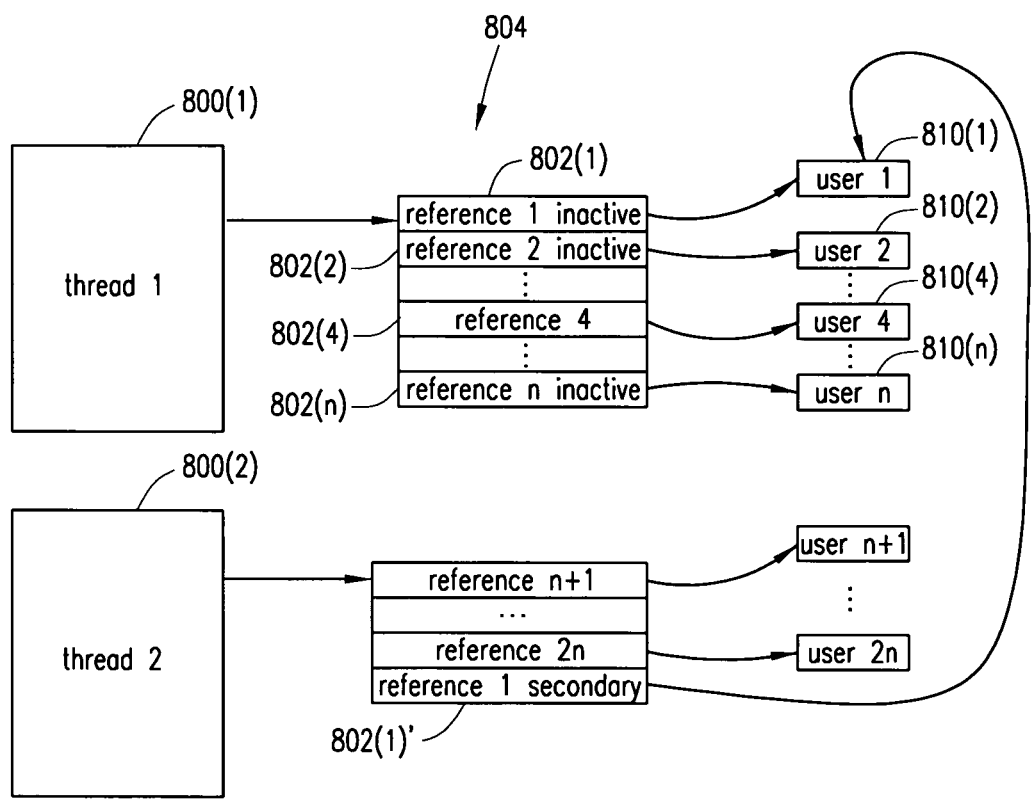
FIG. 8 is a block diagram depicting fail over of a user object to a secondary thread responsive to hanging of a primary thread thereof in accordance with an embodiment.

The process described with reference to FIG. 7 is further illustrated in FIG. 8. As shown in FIG. 8, a first thread 800(1) includes n references 802(1)-802(n) in a reference list 804 each of which is assigned to a respective user 810(1)-810(n). It will be assumed for the sake of example that a task being performed for the user 810(4) has caused the thread 800(1) to hang. As a result, the remaining references 802(1)-802(3) and 802(5)-801(n) are inactivated and the users associated therewith are added to the reference lists of other threads. For example, as illustrated in FIG. 8, a reference 802(1)' ("reference 1 secondary"), is added to the reference list of a second thread 800(2) as a secondary reference for the user 810(1). Although not shown, the same is effected for the remaining users 810(2)-810(3) and 810(5)-810(n) associated with the first thread 800(1).

In one embodiment, the users 810(1)-810(3) and 810(5)-810(n) are reallocated using load balancing and other techniques as described in U.S. patent application Ser. No. 11/240,205, filed Sep. 30, 2005 entitled "METHOD AND SYSTEM FOR ADAPTIVE ALLOCATION OF THREADS TO USERS IN A COMPUTER SYSTEM".

While this disclosure has described a mobile communications device operating within a network system with reference to illustrative embodiments, this description is not intended to be construed in a limiting sense. Various modifications and combinations of the illustrative embodiments as well as other embodiments, will be apparent to persons skilled in the art upon reference to the description. It is, therefore, intended that the appended claims encompass any such modifications or embodiments.

What is claimed is:

1. A method, operating on a computer system that uses a plurality of threads, for allocating the threads, the method comprising:

queuing up work for a first user;

assigning a first thread of the plurality of threads to the first user to perform the queued up work for the first user, the assignment being permanent until the computer system is shut down or an error condition occurs, wherein only the first thread is used to access resources used by the first user and upon the completing the queued up work for the first user, the necessary databases and resources used by the first user remain open for use only by the first thread;

responsive to a determination that the primary database can be opened, opening the primary database and performing operations using the primary database;

responsive to a determination that the primary database cannot be opened, opening a backup database for the first user and performing operations using the backup database; and responsive to detection of a first error condition comprising a hang-up condition of the first thread, migrating the first user to a second thread.

2. A system for allocating threads to a user in a server environment that supports a plurality of threads, the system comprising:

a server computer;

software executable on the server computer to queue up work for a first user;

software executable on the server computer to assign a first thread to the first user to perform the queued up work for the first user, the assignment being permanent until the server computer is shut down or an error condition occurs, wherein only the first thread is used to access resources used by the first user and upon completing the queued up work for the first user, necessary databases and resources used by the first user remain open for use only by the first thread;

software executable on the server computer, responsive to a determination that the primary database can be opened, to open the primary database and to perform operations using the primary database;

software executable on the server computer, responsive to a determination that the primary database cannot be opened, to open a backup database for the first user and to perform operations using the backup database; and software executable on the server computer, responsive to detection of a first error condition comprising a hang-up condition of the first thread, to migrate the first user to a second thread.

3. A computer system comprising:

a host computer; and redirector software executable on the host computer, the redirector software for redirecting data items of a user to the user's mobile data communications device ("MDCD"), wherein:

responsive to work being queued up for the user, the host computer assigns a thread to the user to perform the queued up work for the user, the assignment being permanent until the host computer is shut down or an error condition occurs, only the first thread is used to access resources used by the first user and upon completing the queued up work for the first user, the necessary databases and resources used by the first user remain open for use only by the first thread;

responsive to a determination that the primary database can be opened, the host computer opens the primary database and performs operations using the primary database;

responsive to a determination that the primary database cannot be opened, the host computer opens a backup database for the first user and performs operations using the backup database; and responsive to detection of a first error condition comprising a hang-up condition of the first thread, the host computer migrates the first user to a second thread.

* * * * *